March 17, 1953     B. DIEM     2,632,116
RESTAURANT CHECK HAVING PHOSPHORESCENT
AREA FOR CHECK TOTAL
Filed June 10, 1948
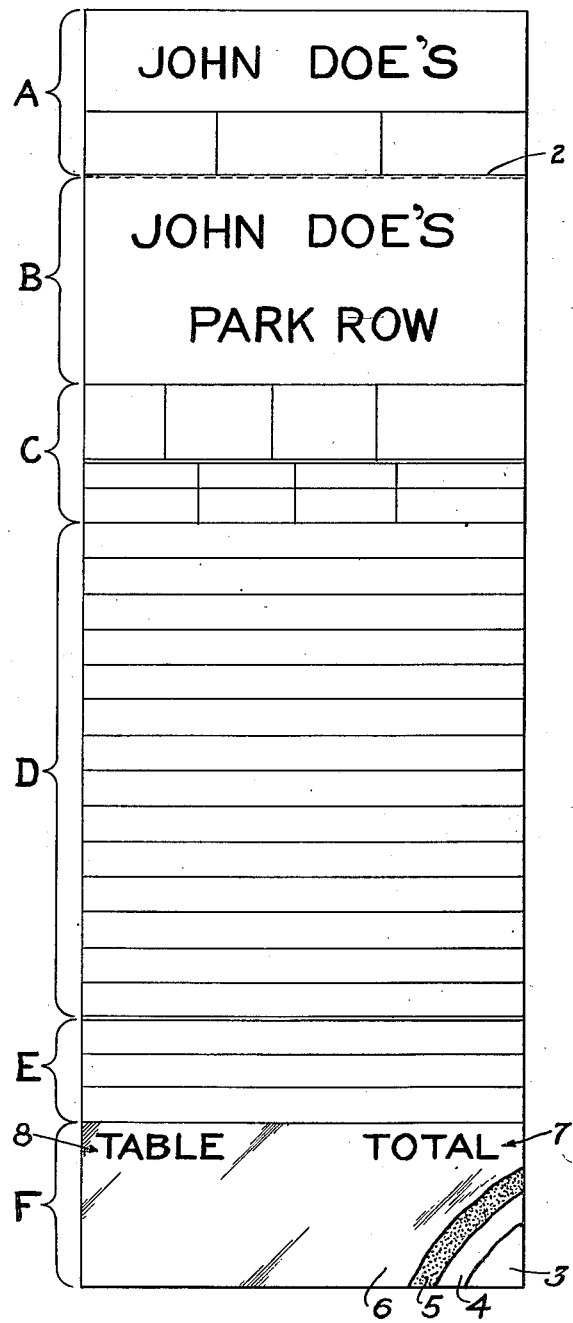
Inventor
Bert Diem
By
Synnestvedt & Lechner
Attorneys Patented Mar. 17, 1953

2,632,116

UNITED STATES PATENT OFFICE 2,632,116

RESTAURANT CHECK HAVING PHOSPHO-
RESCENT AREA FOR CHECK TOTAL

Bert Diem, Glenview, Ill.

Application June 10, 1948, Serial No. 32,106

5 Claims. (Cl. 250—71)

This invention relates to an improved restaurant check.

In considering the objects and advantages of the invention, attention is first directed to certain problems which are encountered in connection with restaurant checks and use thereof, as follows:

In many restaurants checking and control systems have been adopted, according to which it is intended that the total of the check shall be applied thereto only by a cashier or by other supervisory personnel. It is further intended that the patron shall pay only the check total which has been applied to the check by the cashier. This system has been adopted in an effort to avoid inaccuracies which may occur as a result of careless addition, and also in an effort to avoid presentation of checks to patrons on which the total has been deliberately and fraudulently increased beyond the correct figure by a dishonest waiter, and still further to avoid defrauding the restaurant owner by unauthorized tampering with the check total.

However, such prior efforts to avoid defrauding a patron or the restaurant owner have not been completely successful for various reasons including the fact that ordinarily the check total inscribed upon the check by the cashier may with relative ease be erased and raised before presentation of the check to the patron, and thereafter again erased and lowered to the original figure before return of the check to the cashier.

It may also be mentioned that even in instances where a patron may suspect that the total of the check presented to him may have been improperly raised, the patron senses embarrassment in calling attention to the error, especially when accompanied by guests.

Various of the difficulties encountered in the use of restaurant checks are aggravated in many restaurants which customarily are lighted at a relatively low level, so that it is difficult for the patron to read the individual items on the check as well as the total.

With the foregoing difficulties in mind, the present invention has as one of its primary objects the provision of a restaurant check affording greater assurance against inaccuracy and fraud with respect to the total to be paid by the patron and with respect to the funds to be returned to the cashier. A further object of the invention is to provide a check in which the area provided for inscription of a total stands out clearly from the remainder of the check.

Still further, the invention contemplates a restaurant check on which the total figure will be clearly visible regardless of the lighting in the restaurant and, indeed, even in complete darkness.

The foregoing and other objects are attained by the provision of a check, having the area provided for inscription of the total coated with a phosphorescent material, in the manner described more fully herebelow.

Some of the more specific objects of the invention include provision of a phosphorescent coated area for inscription of the check total having such surface characteristics as to clearly increase the difficulty with which a total inscribed thereon by the cashier may be altered. The phosphorescent coating provided for inscription of the total is also so formulated and applied as to effectively seal the phosphorescent material as against adverse influence by moisture, and in the case of use of odoriferous phosphorescent pigments, the invention further preferably provides for sealing-in objectionable odors.

Still further, it is an object of the invention to provide a phosphorescent coating of such characteristics as to retain luminescence over a prolonged period of time following activation thereof, so that visibility of the check total inscribed thereon will be assured even where the check is not presented for payment until a number of hours following the initial activation.

Another object of the invention is the arrangement of the phosphorescent coated area of the check in such location as to attract the attention of the patron. In the check of the invention, moreover, indicia are printed upon the check, preferably upon the phosphorescent coating, identifying or calling attention to the phosphorescent coated area as the area for inscription of the check total.

How the foregoing and other objects and advantages are attained will appear still more fully from the following description referring to the accompanying drawing of which the single figure illustrates a preferred embodiment of a check according to the invention.

As shown in the drawing, the check is divided into various areas provided for various different purposes. These have been bracketed and identified by letters A to F inclusive. The top constitutes a stub which may be made detachable as by scoring provided along the line 2, and such stub may be employed in the checking or control system of the restaurant. Area B, as indicated may carry printed identification of the restaurant. Area C is blocked off to provide for inscription of various items of information customarily needed for ordering purposes as well as for record. Area D is provided for listing the orders to be served. Area E may serve for insertion of special data, such as taxes or the like. Area F comprises the area on which the total is to be inscribed, this area preferably being located at the bottom of the check, as is shown, and carrying the phosphorescent coating contemplated by the present invention.

The phosphorescent coating may be formulated and applied in several different ways as is described more fully herebelow. Briefly, it may here be mentioned that the phosphorescent pigment may be applied in suspension in a vehicle, the vehicle being diluted with a volatile solvent. Such a vehicle may be directly applied to the card of which the check is made as a single coating, and when this vehicle is properly formulated, as described hereinafter, it will effectively protect the phosphorescent pigment and in the case of odoriferous pigments will also effectively seal-in objectionable odors. On the other hand, for maximum assurance of protection of the phosphorescent pigment and sealing-in of objectionable odors, the area F may first be coated with a base or undercoat (not containing phosphorescent material), over which the phosphorescent material is applied, this area then being covered with a third coating in the nature of a clear or transparent top or sealing coat. This triple coated embodiment is illustrated in the drawing, the several layers being in part broken away at the lower right-hand corner of the figure. Thus, as shown in the drawing, the card itself appears at 3, the undercoating at 4, the phosphorescent layer at 5 and the top coating at 6.

According to another method for applying the phosphorescent coating, an unpigmented film may first be applied, for instance, a varnish-type film, and thereafter powdered pigment dusted over the film before complete drying thereof. The dusted coating is then baked or dried and, if desired, a clear top coat applied over the baked layer.

For the purpose of further calling attention to the total to be paid by the patron, it is preferred that the check carry indicia as indicated at 7 calling attention to the area for inscription of the total, such indicia most desirably being printed over the phosphorescent coated area itself, so as to be plainly visible not only in ordinary lighting, but even in the absence of any source of external lighting. As a further measure to avoid error this area further carries indicia such as indicated at 8 to call attention to the table number to which the check has been assigned. In use it will be understood that the number (or other convenient identification of the table) is inscribed by the cashier or a checker or other supervisory personnel in the area below the indicia 8. Similarly, when the check is to be presented for payment, the total is to be inscribed on the phosphorescent material below the indicia 7.

Since the phosphorescent pigments ordinarily have yellowish color when observed either in daylight or in ordinary artificial light, the indicia such as indicated at 7 and 8 are preferably applied by printing or the like which is black or a relatively dark shade of red, blue, brown or green. Printing of such indicia in this way also provides good visibility thereof against the luminescence of the phosphorescent material, when external sources of lighting are absent.

For the purpose of inscribing the table identification and the check total, I have found that a red crayon is highly effective, not only from the standpoint of visibility under ordinary lighting conditions, but also against the luminescence of the phosphorescent material in the absence of external lighting. Such crayon is preferably one made with a base of a relatively high melting wax.

A special advantage of employment of a wax crayon for inscription of the check total and/or table identification lies in the fact that the inscriptions are exceedingly difficult to erase or alter. Upon attempt to erase such inscriptions, it is found that the wax spreads and smears over the surface and can be removed therefrom only with great difficulty. Indeed, tampering with these inscriptions produces clearly visible evidence thereof.

It will be understood that in use of the check of the present invention each check will be exposed to an activating light prior to delivery thereof to the waiter, so that the desired luminescence of the phosphorescent coated area will be established before the check goes into use, and so that when the check is totalled and presented to the patron, the total will be clearly visible regardless of the conditions of lighting.

With respect to the coating materials to be employed, attention is called to the following:

While any of the customary phosphorescent pigments may be used, I prefer to employ the readily commercially available phosphorescent zinc sulphide pigment. As is known, such pigments manifest the property of continuining to luminesce even for considerable periods of time after an activating light source has been withdrawn. As is also known, this type of pigment will manifest this property provided minute quantities of certain metallic elements, such as copper, are present in addition to the zinc sulphide itself. However, this type of pigment material is commonly referred to as phosphorescent zinc sulphide pigment and is therefore so identified herein. Pigment materials of the type just mentioned are commonly supplied in powder form and may be used for coating purposes by dispersion in a vehicle or binder, or dusting.

A vehicle suitable for the present purposes may be made up in a variety of ways and with a variety of materials. Resinous type vehicles are particularly suitable, for instance neutral clear lacquers, spirit varnish, or vehicle compositions containing methyl methacrylate, vinyl acetate, alkyd or other resins. It will be understood that the ingredients of the vehicle should be selected so as not to react with the phosphorescent zinc sulphide pigment to be dispersed therein. A particularly effective formulation is one of which the vehicle solids largely comprise alkyd resin, together with driers and solvent, such as mineral spirits, and preferably also including a minor quantity of an acrylic ester resin.

A vehicle of the above type may be mixed in paste form with the phosphorescent pigment in the proportions of approximately 55% of vehicle and 45% of pigment. This should then be diluted with a volatile solvent such as mineral spirits or toluol to provide a proper working consistency.

Such a coating material will provide a good adherence to the check card and it will not adversely influence the action of the phosphorescent material and will withstand fluctuations in temperature, as well as exposure to moisture.

A vehicle such as described above, but in unpigmented form, may be used if desired either as an undercoating or an overcoating for the pigmented layer, in the manner described above with reference to the drawing, or may be used as a base layer upon which to dust powdered phosphorescent pigment.

I claim:

1. A restaurant check having an area for inscription of a check total and carrying a phosphorescent coating on said area to provide a contrast in appearance between said area and other areas of the check and to provide visibility of a total figure inscribed thereon even in the absence of an external source of lighting.

2. A restaurant check according to claim 1 in which the check further has indicia printed thereon identifying said coated area as the area for the check total.

3. In a restaurant check having an area for inscription of a check total, a phosphorescent coating applied to said area of the check, and opaque indicia printed on said coating identifying said total area as such, to thereby provide visibility of said indicia and of a total figure inscribed thereon even in the absence of an external source of lighting.

4. A restaurant check having a phosphorescent coating applied to an area of the check toward the bottom thereof and serving as a surface for inscription of a check total, other areas of the check being uncoated to thereby provide a contrast in appearance between the area for the total and other areas of the check and to provide visibility of a total figure inscribed thereon, even in the absence of an external source of lighting.

5. A restaurant check according to claim 4 in which the check further has indicia printed thereon identifying said coated area as the area for the check total.

BERT DIEM.

REFERENCES CITED

The following references are of record in the file of this patent:

UNITED STATES PATENTS

| Number | Name | Date |
| --- | --- | --- |
| 1,351,935 | Willis | Sept. 7, 1920 |
| 1,374,875 | Bethke | Apr. 12, 1921 |
| 2,391,705 | Isenberg | Dec. 25, 1945 |

FOREIGN PATENTS

| Number | Country | Date |
| --- | --- | --- |
| 559,603 | Great Britain | Feb. 25, 1944 |

OTHER REFERENCES

The ABC of Luminescence by New Jersey Zinc Co., New York, N. Y., p. 20, 1944.